(12) United States Patent
Shin

(10) Patent No.: US 10,930,971 B2
(45) Date of Patent: Feb. 23, 2021

(54) SOLID-STATE BATTERY WITH POLYMER ELECTRODE STRUCTURE

(71) Applicant: Nissan North America, Inc., Franklin, TN (US)

(72) Inventor: Hosop Shin, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 408 days.

(21) Appl. No.: 15/906,837

(22) Filed: Feb. 27, 2018

(65) Prior Publication Data
US 2019/0267666 A1 Aug. 29, 2019

(51) Int. Cl.
| | | |
|---|---|---|
| *H01M 10/0562* | (2010.01) | |
| *H01M 4/38* | (2006.01) | |
| *H01M 4/66* | (2006.01) | |
| *H01M 10/0525* | (2010.01) | |

(52) U.S. Cl.
CPC ....... *H01M 10/0562* (2013.01); *H01M 4/386* (2013.01); *H01M 4/661* (2013.01); *H01M 10/0525* (2013.01); *H01M 2300/0065* (2013.01)

(58) Field of Classification Search
CPC ................................................ H01M 10/0562
See application file for complete search history.

(56) References Cited

U.S. PATENT DOCUMENTS

| | | | |
|---|---|---|---|
| 9,349,497 B2 | 5/2016 | Kim et al. | |
| 2009/0068559 A1* | 3/2009 | Gamoh | H01M 4/485 |
| | | | 429/220 |
| 2011/0033754 A1* | 2/2011 | Shimizu | H01M 2/1646 |
| | | | 429/231.95 |
| 2011/0123866 A1* | 5/2011 | Pan | H01M 2/16 |
| | | | 429/221 |
| 2013/0209873 A1* | 8/2013 | Nagasaka | H01M 2/1673 |
| | | | 429/209 |
| 2014/0287305 A1 | 9/2014 | Wachsman et al. | |
| 2016/0087271 A1 | 3/2016 | Jarvis et al. | |
| 2016/0204427 A1* | 7/2016 | Vereecken | H01M 10/0585 |
| | | | 429/162 |

OTHER PUBLICATIONS

Definitions (Year: 2020).*

* cited by examiner

*Primary Examiner* — Brian R Ohara
(74) *Attorney, Agent, or Firm* — Young Basile Hanlon & MacFarlane, P.C.

(57) ABSTRACT

A solid-state battery includes an anode current collector and an anode layer on the anode current collector. The anode layer comprises anode active material composed of anode active particles each encapsulated in a solid ion conductor. The solid-state battery also includes a cathode current collector and a cathode layer on the cathode current collector. The cathode layer comprises cathode active material composed of cathode active particles each encapsulated in the solid ion conductor. A solid electrolyte structure separating the anode layer and the cathode layer has anode-side columns and cathode-side columns aligning parallel to a stacking axis of the solid-state battery, the anode-side columns extending into the anode layer and the cathode-side columns extending into the cathode layer.

11 Claims, 5 Drawing Sheets

SOLID-STATE BATTERY WITH POLYMER ELECTRODE STRUCTURE

TECHNICAL FIELD

This disclosure relates to solid-state batteries and the active material and electrolyte structures used therein.

BACKGROUND

Conventional lithium-ion batteries use a liquid electrolyte that requires additional space in each battery cell, can be flammable and can be prone to leaking. Solid-state batteries use a solid electrolyte, eliminating risk of leaking flammable material and requiring less electrolyte space. However, solid polymer electrolytes conduct ions sparingly, especially near room temperature. This poor conductance of the solid electrolyte leads to poor battery performance. Although there have been many improvements on the ionic conductivity of solid electrolytes, the solid-state battery still experiences high interfacial impedance and low energy density. High interfacial impedance arises from limited contact surface area between the solid electrolyte and the active material where lithium-ion transfer occurs.

SUMMARY

Disclosed herein are embodiments of solid-state electrodes having electrolyte structures that reduce interfacial impedance and allow for increased thickness of active material.

One embodiment of a solid-state battery as disclosed herein includes an anode current collector and an anode layer on the anode current collector. The anode layer comprises anode active material composed of anode active particles each encapsulated in a solid ion conductor. The solid-state battery also includes a cathode current collector and a cathode layer on the cathode current collector. The cathode layer comprises cathode active material composed of cathode active particles each encapsulated in the solid ion conductor. A solid electrolyte structure separating the anode layer and the cathode layer has anode-side columns and cathode-side columns aligning parallel to a stacking axis of the solid-state battery, the anode-side columns extending into the anode layer and the cathode-side columns extending into the cathode layer.

Another embodiment of a solid-state battery includes an anode current collector and an anode layer on the anode current collector. The anode layer comprises anode active material composed of one or more of graphite, silicon or metal oxide particles each encapsulated in a solid ion conductor. The solid-state battery further includes a cathode current collector and a cathode layer on the cathode current collector. The cathode layer comprises cathode active material composed of cathode active particles each encapsulated in the solid ion conductor. A solid electrolyte structure separating the anode layer and the cathode layer has anode-side columns and cathode-side columns aligning parallel to a stacking axis of the solid-state battery, the anode-side columns extending into the anode layer between 70% and 90% of a thickness of the anode layer and the cathode-side columns extending into the cathode layer between 70% and 90% of a thickness of the cathode layer. The solid electrolyte structure is composed of a base polymer, lithium salt, and ceramic particles, the ceramic particles individually positioned within the anode-side columns and the cathode-side columns.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

To reduce the high interfacial impedance arising from limited contact surface area between the solid electrolyte and the active material where lithium-ion transfer occurs, one approach has been to mix the solid electrolyte with the active material in the electrode. This approach requires a large amount of electrolyte to produce the contact surface area. This large percentage of solid electrolyte accordingly reduces the amount of active material that can be used. This, in turn, compromises the energy density of the battery. Furthermore, this approach still only provides limited contact surface area due to the irregularity of solid electrolyte placement after mixing and settling.

Disclosed herein are solid-state batteries having reduced weight percent of electrolyte while reducing the interfacial impedance in the electrode. For example, conventional mixing of electrolyte with active material can require up to 50 wt. % electrolyte. The embodiments herein only require between about 20 to 30 wt. % electrolyte. This, in turn, results in solid-state batteries with higher energy densities than conventional solid-state batteries.

Figure 1:
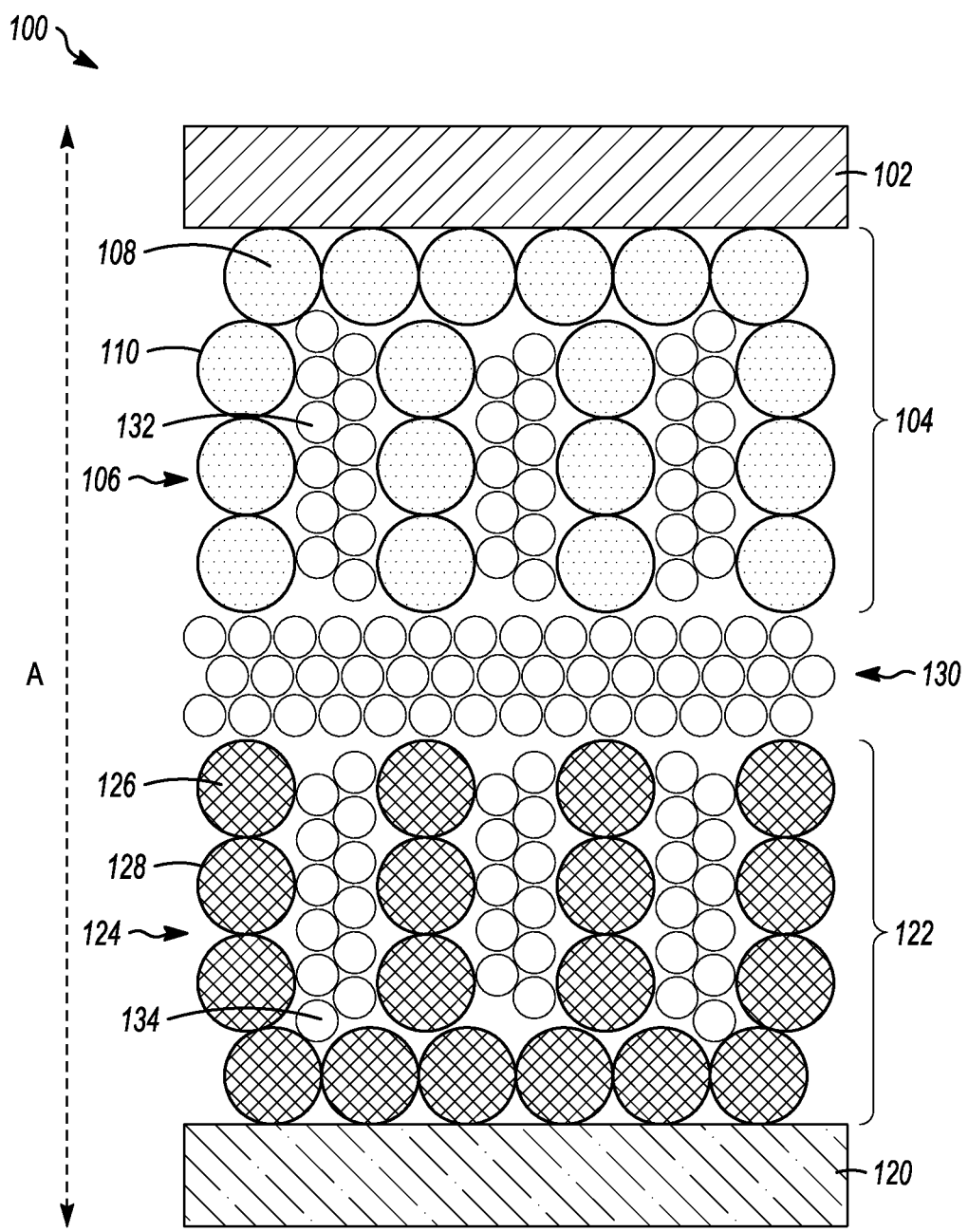
FIG. 1 is a side view of an embodiment of a solid-state battery as disclosed herein.

FIG. 1 illustrates a solid-state battery 100 as disclosed herein. The solid-state battery 100 includes an anode current collector 102 made of, for example, a copper foil, and an anode layer 104 on the anode current collector 102. The anode layer 104 comprises anode active material 106 composed of anode active particles 108 each encapsulated in a solid ion conductor 110. The solid-state battery 100 also includes a cathode current collector 120 made of, for example, an aluminum foil, and a cathode layer 122 on the cathode current collector 120. The cathode layer 122 comprises cathode active material 124 composed of cathode active particles 126 each encapsulated in the solid ion conductor 128. A solid electrolyte structure 130 separating the anode layer 104 and the cathode layer 122 has anode-side columns 132 and cathode-side columns 134 aligning parallel to a stacking axis A of the solid-state battery 100, the anode-side columns 132 extending into the anode layer 104 and the cathode-side columns 134 extending into the cathode layer 122.

The anode active material 106 can be graphite, silicon or other metal oxides. Graphite-based anode materials used in conventional lithium-ion batteries undergo electrochemical reactions, coupled with mechanical degradation during battery operation, which affect or deteriorate the performance of the batteries. Silicon undergoes substantial expansion and contraction during lithiation and de-lithiation, which deteriorates the active materials. However, the anode active material 106 disclosed herein is encapsulated with a solid ion conductor 110, which, in addition to increasing lithium ion flow through the anode, protects the graphite-based anode material from mechanical and electrochemical degradation.

The cathode active material 126 can be a transition metal compound capable of storing and releasing lithium may be used, and a transition metal oxide, etc., containing at least one element selected from the group consisting of manganese, cobalt, nickel, vanadium, niobium, molybdenum, and titanium may be used. For example, a lithium manganese complex oxide, manganese dioxide, a lithium nickel complex oxide, a lithium cobalt complex oxide, a lithium nickel cobalt complex oxide, a lithium vanadium complex oxide, a lithium titanium complex oxide, titanium oxide, niobium oxide, vanadium oxide, tungsten oxide, etc., and derivatives thereof may be used. Carbon, graphite, carbon fibers, metal powder, metal fibers, etc., having a conducting property as the electron conducting aid can be added.

The active material 108, 126 is encapsulated in an ion conductor 110, 128. The ion conductor 110, 128 can be the same for both the anode active material 108 and the cathode active material 126 or can be different. Ion conductors 110, 128 include ion conducting polymers and ion conducting ceramic materials. Examples of ion conducting polymers include, but are not limited to, polyethylene oxide (PEO), poly(p-phenylene oxide) (PPO), polyvinyl dichloride (PVD), polyacrylonitrile (PAN), poly(methyl methacrylate) (PMMA), polyethylene glycol (PEG), PVDF-HFP, and polyimide (PI). Examples of ion conducting ceramic materials include, but are not limited to, lithium phosphorous oxynitride (LiPON), LATP, LTP, LAYTP, LAGP, LAGTP, LLT, LLTO, LSLTO, LLBO, LBLTO, lanthanum lithium zirconium oxide (c-LLZO), LZGO $Li_2S$—$P_2S_5$, and $Li_2S$—$Li_2O$—$P_2S_5$.

The solid electrolyte structure 130 is formed of a solid electrolyte made from a base ion conducting polymer, lithium salts, and ion conducting ceramic particles. Inert ceramic particles can also be used for mechanical strength. Examples of lithium salts include, but are not limited to, $Li_2SO_4$, $LiNO_3$, $LiAsF_6$, $LiClO_4$, $LiCF_3SO_3$, $LiPF_6$, $LiBF_4$, LIBOB, LiTFSI, and LiDMSI. Examples of inert ceramic material include, but are not limited to, $Al_2O_3$, $SiO_2$, and $TiO_2$. As shown in FIG. 1, the solid electrolyte can be injected into the anode layer 104 and the cathode layer 122 to form anode-side columns 132 and cathode-side columns 134, respectively. A layer of the solid electrolyte is formed between the anode layer 104 and the cathode layer 122. The columns 132, 134 increase the contact surface area between the solid electrolyte and the active material where lithium-ion transfer occurs. The encapsulation material of the active particles 106, 124 transports lithium ions from the interface to the remainder of the anode layer 104 and cathode layer 122. The combination allows for a reduction in the amount of solid electrolyte required in a conventional solid-state battery, providing a greater weight percent active material in an equivalently thick electrode.

Figure 2:
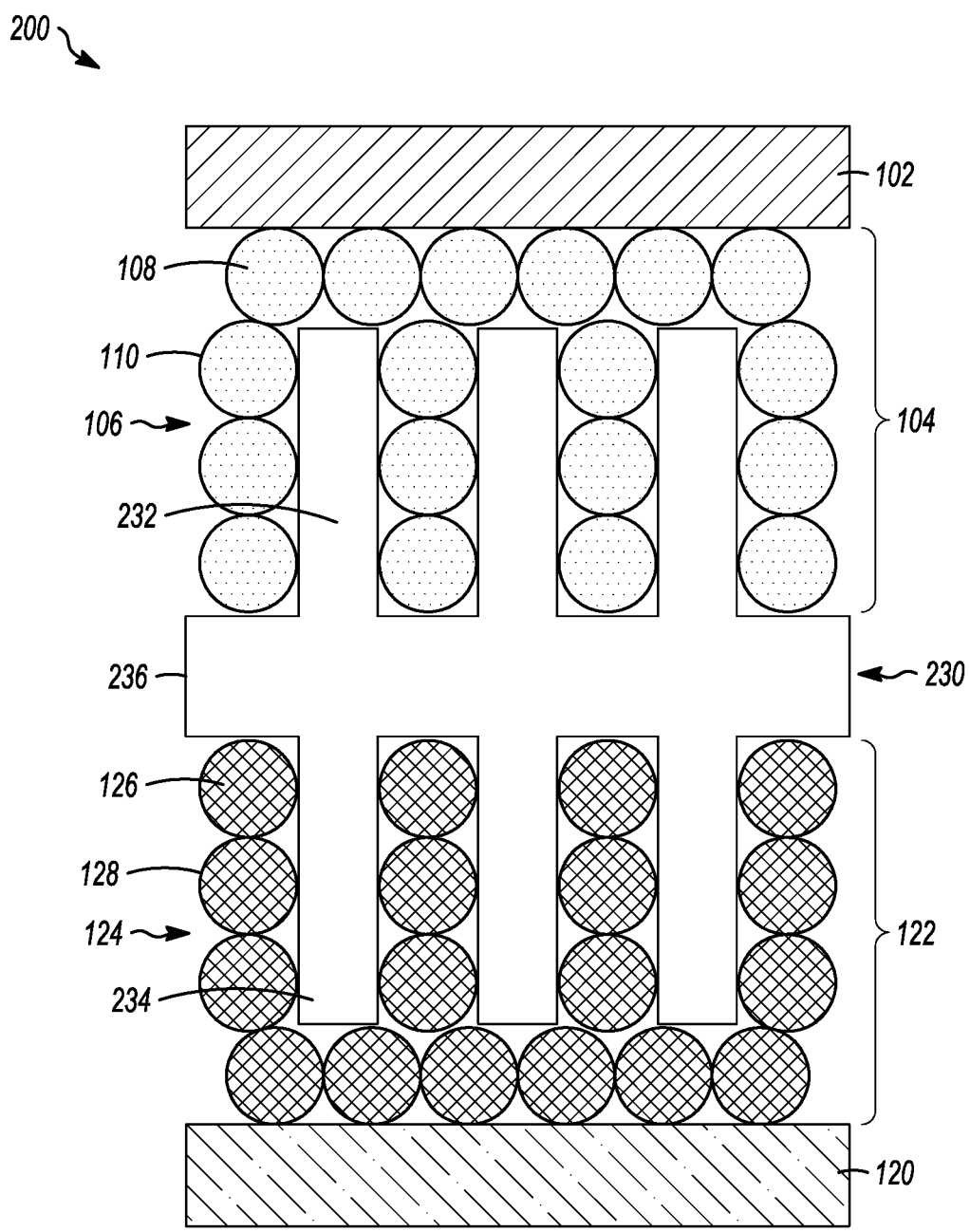
FIG. 2 is a side view of another embodiment of a solid-state battery as disclosed herein.
Figure 3:
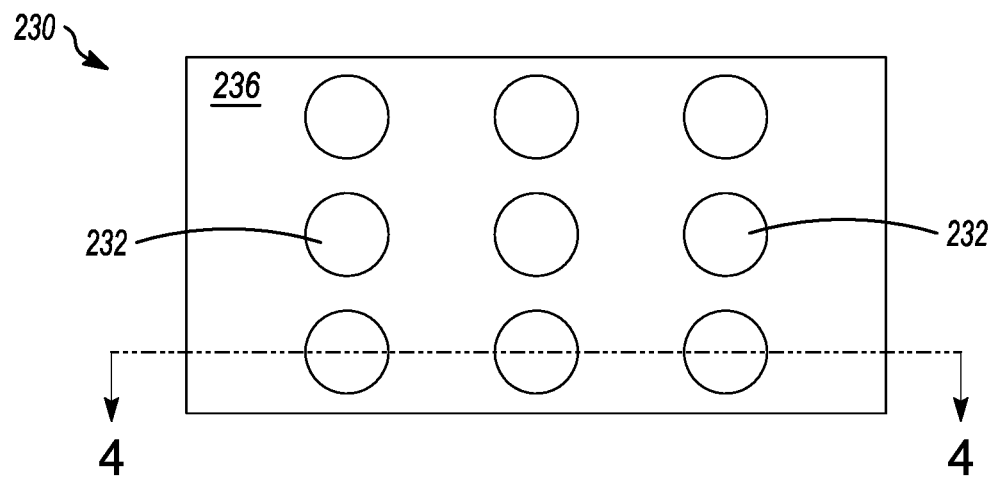
FIG. 3 is a plan view of a solid electrolyte structure as disclosed herein.

FIG. 2 illustrates another embodiment of a solid-state battery 200 disclosed herein. Reference numbers remain the same for elements that are the same as those in FIG. 1. As illustrated in FIG. 2, the solid electrolyte structure 230 is a solid structure made from the solid electrolyte. FIG. 3 is a plan view of the anode-facing side of the solid electrolyte structure 230, showing the solid electrolyte layer 236 with the anode-side columns 232. The solid electrolyte layer 236 between the anode layer 104 and the cathode layer 122 can be between about 20 micron and 100 micron in thickness. The thinness of the solid electrolyte layer 236 is dependent on fabrication. The columns 232, 234 can be uniformly spaced as illustrated, although the number of columns 232, 234 and spacing is provided as examples only. Columns 232, 234 are shown to be round but this is not meant to be limiting and any shape is contemplated. In general, a diameter of the columns 232, 234 can be between about 1 micron and 20 microns. The columns 232, 234 can be between about 20% to 30% of the weight of the electrode. The columns 232, 234 can extend the thickness of the respective anode layer 104 and cathode layer 122 or can extend between about 50% to 90% of the thickness of the respective layers, and more particularly, about 70% to 90% of the thickness of the respective layers.

Figure 4:
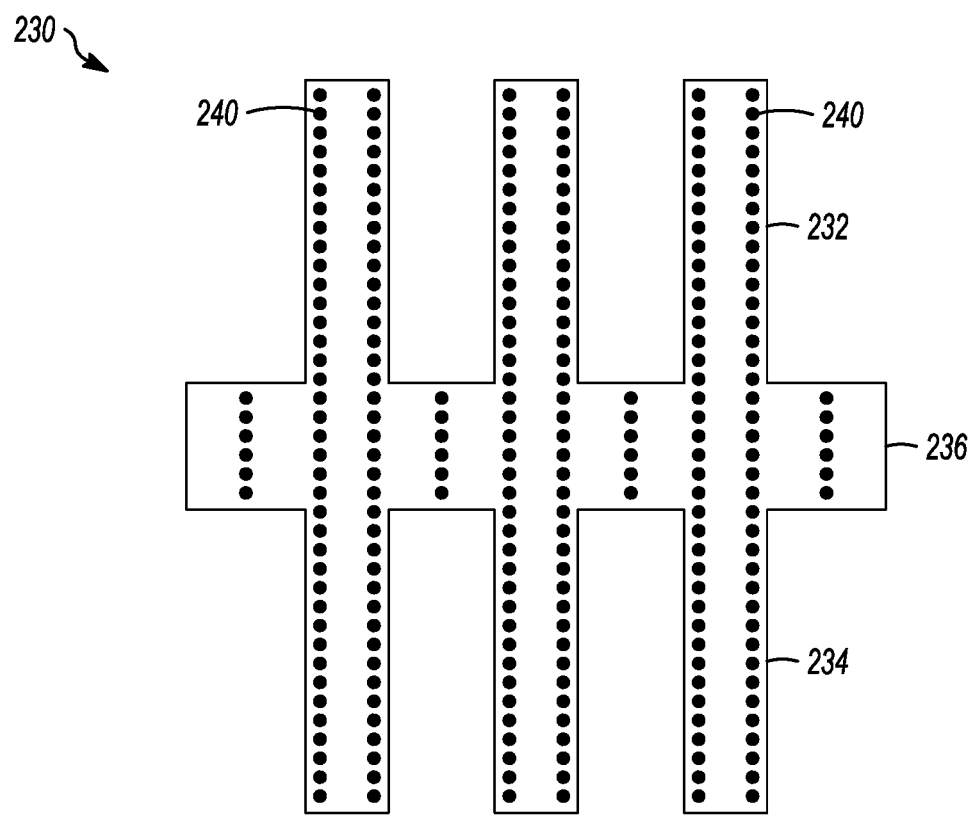
FIG. 4 is a cross sectional view of an embodiment of the solid electrolyte structure of FIG. 3 as disclosed herein.
Figure 5:
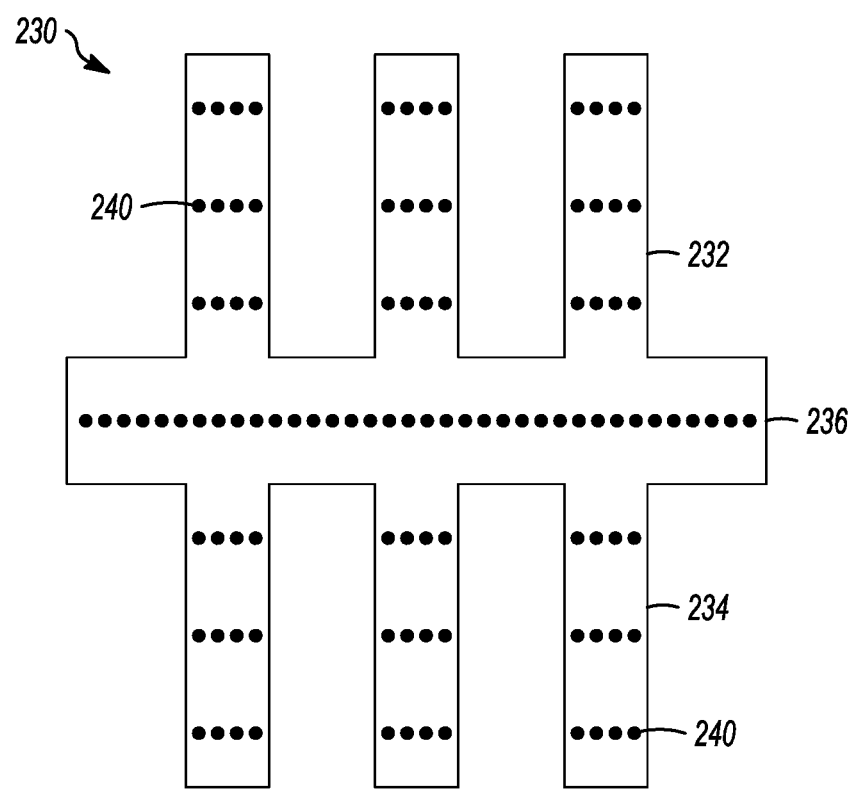
FIG. 5 is a cross sectional view of another embodiment of the solid electrolyte structure of FIG. 3 as disclosed herein.

The solid electrolyte structure 230 can be made using an ink jet printer, 3D printer, magnetic or electronic forces, and laser ablation methods, as non-limiting examples. The ion conducting ceramic particles 240, and inert ceramic particles if used, can be specifically placed throughout the structure 230. For example, as shown in FIG. 4, the ceramic particles 240 can be vertically aligned, i.e., parallel to the stacking axis A of the battery. The vertical orientation of the ceramic particles 240 is in the direction of lithium-ion transport, and this alignment of the ceramic particles 240 is expected to further increase lithium ion transport into the anode and cathode layers 104, 122. As another example, as illustrated in FIG. 5, the ceramic particles 240 are arranged horizontally, i.e., perpendicular to the stacking axis A of the battery. This horizontal arrangement in the columns 232, 234 can increase mechanical strength and can reduce the growth or formation of lithium dendrites.

Figure 6:
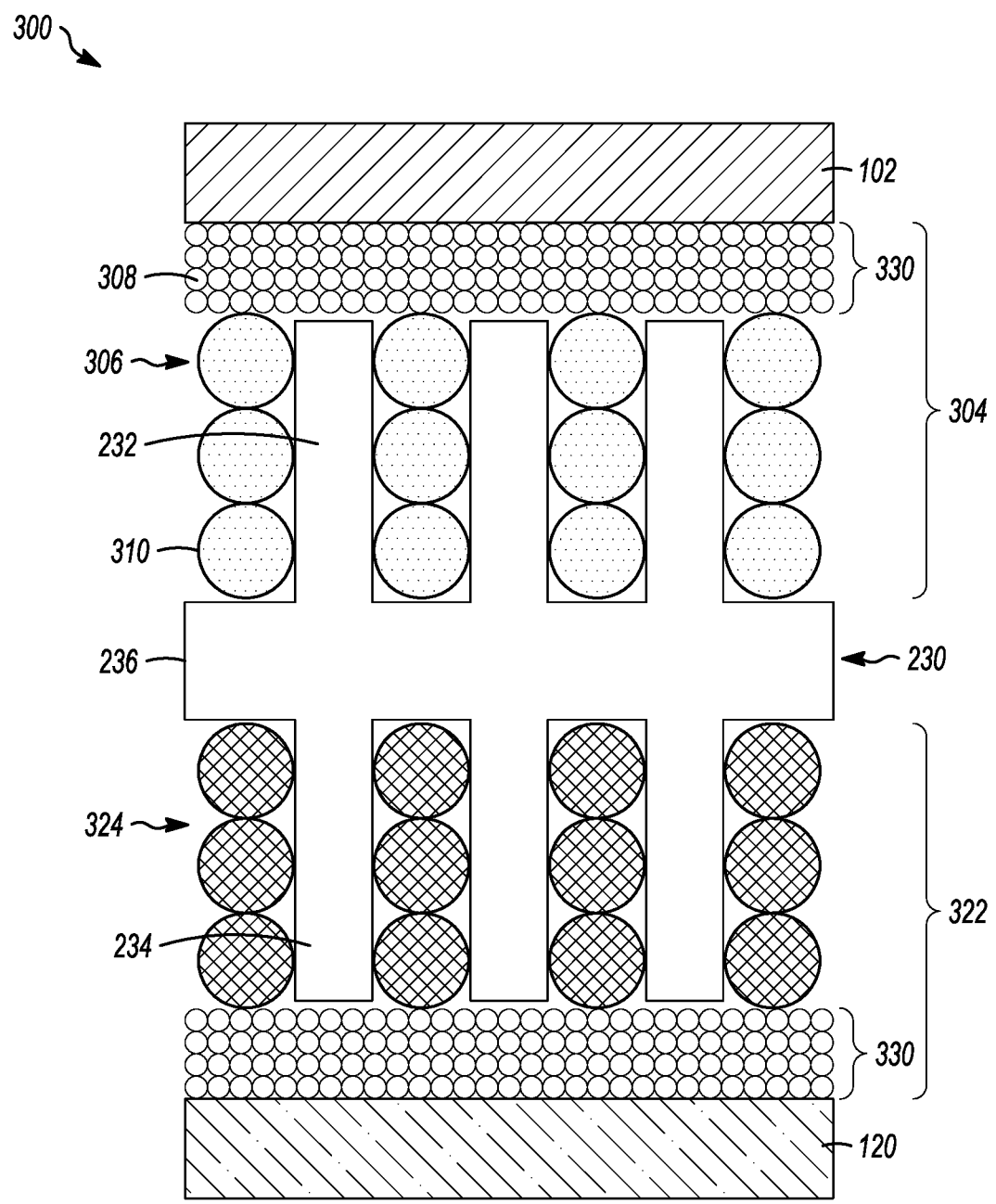
FIG. 6 is a side view of another embodiment of a solid-state battery as disclosed herein.

FIG. 6 is a schematic of another embodiment of a solid-state battery 300 as disclosed herein. Reference numbers remain the same for elements that are the same as those in FIG. 2. In the embodiment in FIG. 6, the anode active material 306 includes first anode particles 308 and second anode particles 310, the first anode particles 308 having a smaller particle size than the second anode particles 310. The first anode particles 308 are directly adjacent to the anode current collector 102. This particle size gradient provides a more porous layer proximate the solid electrolyte structure 230. The first anode particles 308 can have a particle diameter of between 300 nm and 5 microns, inclusive, while the second anode particles 310 can have a particle diameter between 5 microns and 50 microns, inclusive. The cathode active material 324 includes first cathode particles 326 and second cathode particles 328, the first cathode particles 326 having a smaller particle size than the second cathode particles 328. The first cathode particles 326 are directly adjacent to the cathode current collector 120. This particle size gradient provides a more porous layer proximate the solid electrolyte structure 230. The first cathode particles 326 can have a particle diameter of between 300 nm and 5 microns, inclusive, while the second cathode particles 328 can have a particle diameter between 5 microns and 50 microns, inclusive.

The overall thickness of each of the anode layer 104, 304 and the cathode layer 122, 322 can between 50 microns to 200 microns, inclusive. The thickness of the small particle layers 330 can be between 10 microns and 40 microns, inclusive. It should be noted that although the figures illustrate active anode and cathode material 106, 124 having a particle diameter equal to a space between respective anode-side columns 232 and cathode-side columns 234, this is not meant to be limiting. The figures illustrate how the active material is formed in columns due to the design of the solid electrolyte structure 230.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state battery, comprising:
    an anode current collector;
    an anode layer on the anode current collector comprising:
        anode active material composed of anode active particles each encapsulated in a solid ion conductor consisting of a first ion conducting polymer or an ion conducting ceramic;
    a cathode current collector;
    a cathode layer on the cathode current collector comprising:
        cathode active material composed of cathode active particles each encapsulated in the solid ion conductor;
    a solid electrolyte structure separating the anode layer and the cathode layer, the solid electrolyte structure having anode-side columns and cathode-side columns aligning parallel to a stacking axis of the solid-state battery, the anode-side columns extending into the anode layer and the cathode-side columns extending into the cathode layer, wherein the solid electrolyte structure is composed of a second ion conducting polymer, lithium salt, and ion conducting ceramic particles within the ion conducting polymer.

2. The solid-state battery of claim 1, wherein the anode active particles are one or more of graphite, silicon or a metal oxide.

3. The solid-state battery of claim 1, wherein the solid electrolyte structure further comprises inert ceramic particles.

4. The solid-state battery of claim 1, wherein the ion conducting ceramic particles are vertically aligned within the anode-side columns and the cathode-side columns of the solid electrolyte structure.

5. The solid-state battery of claim 1, wherein the ion conducting ceramic particles are horizontally aligned within the anode-side columns and the cathode-side columns of the solid electrolyte structure.

6. The solid-state battery of claim 1, wherein the anode active material proximate the anode current collector has a first particle diameter and a remainder of the anode active material has a second particle diameter, the first particle diameter being smaller than the second particle diameter.

7. The solid-state battery of claim 6, wherein the first particle diameter is between 300 nm and 5 microns, inclusive and the second particle diameter is between 5 microns and 50 microns, inclusive.

8. The solid-state battery of claim 6, wherein the anode-side columns extend into the anode layer until reaching the anode active material with the first particle diameter.

9. The solid-state battery of claim 1, wherein the cathode active material proximate the cathode current collector has a first particle diameter and a remainder of the cathode active material has a second particle diameter, the first particle diameter being smaller than the second particle diameter.

10. The solid-state battery of claim 9, wherein the first particle diameter is between 300 nm and 5 microns, inclusive and the second particle diameter is between 5 microns and 50 microns, inclusive.

11. The solid-state battery of claim 1, wherein the first ion conducting polymer and the second ion conducting polymer are the same ion conducting polymer.

* * * * *